April 27, 1965 R. SIEGEL ETAL 3,181,000
FLUID OPERATED CONTROL SYSTEM
Filed Sept. 6, 1962 4 Sheets-Sheet 1

INVENTORS
Ralph Siegel
Eugene A. Annis
BY Walter G. Finch
ATTORNEY

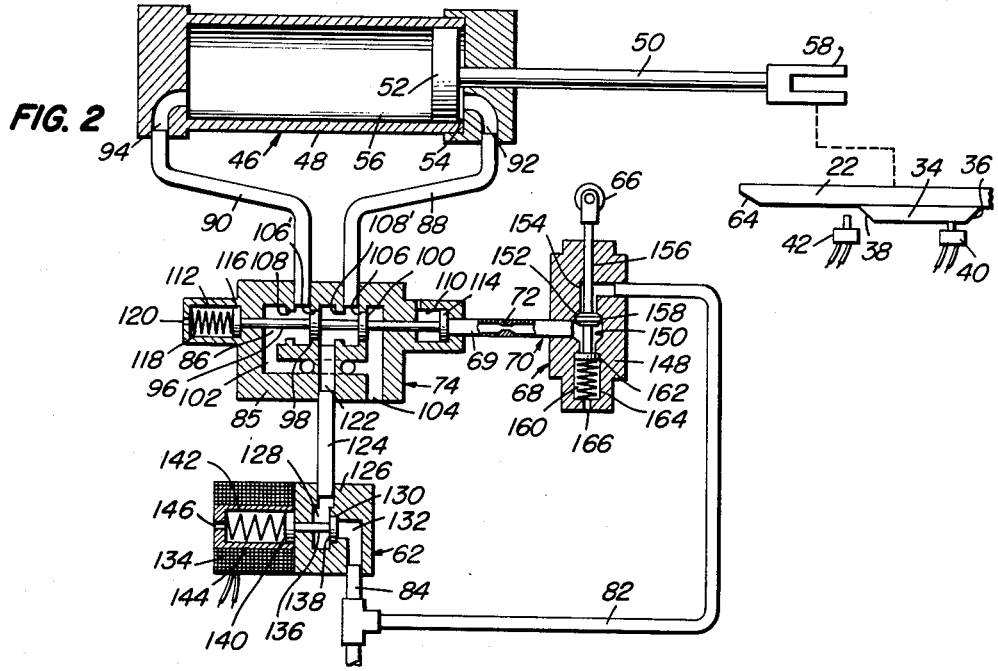
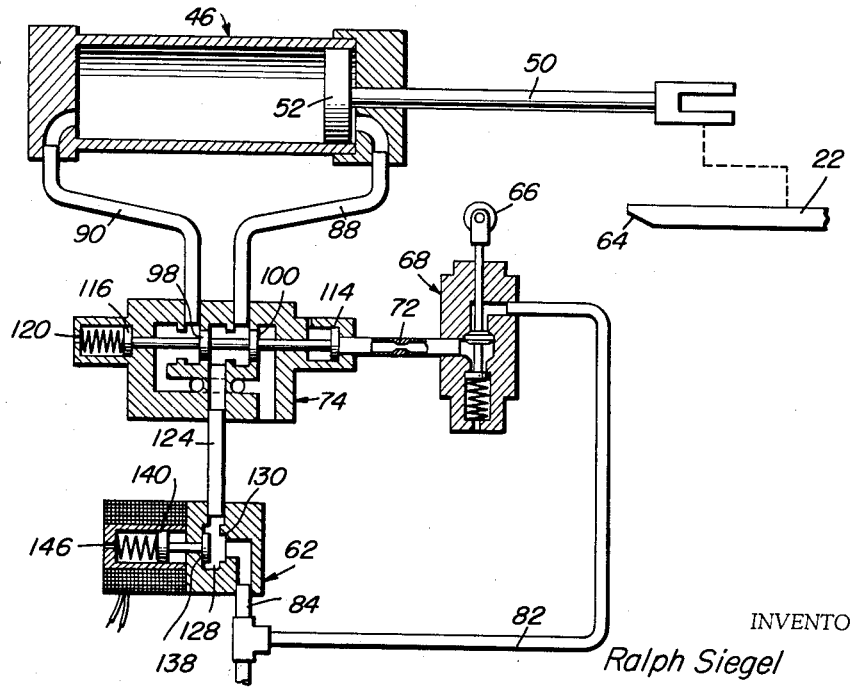

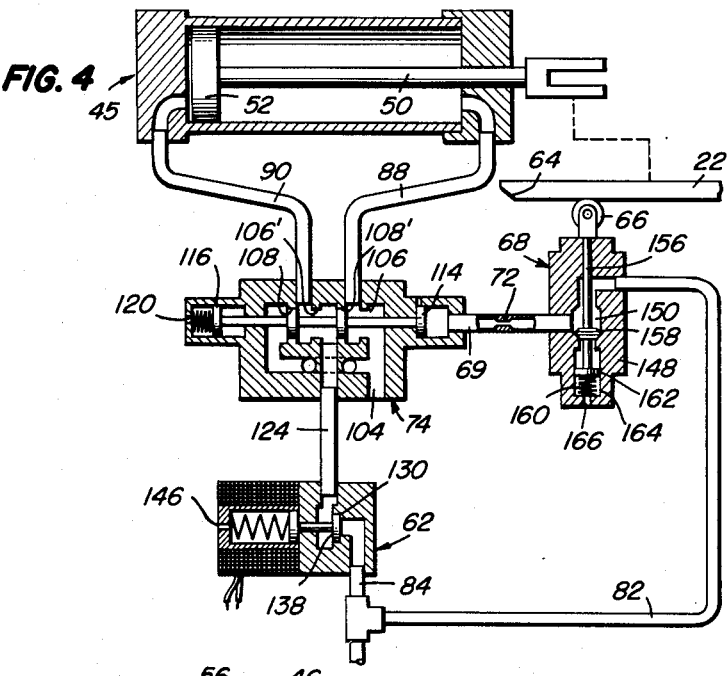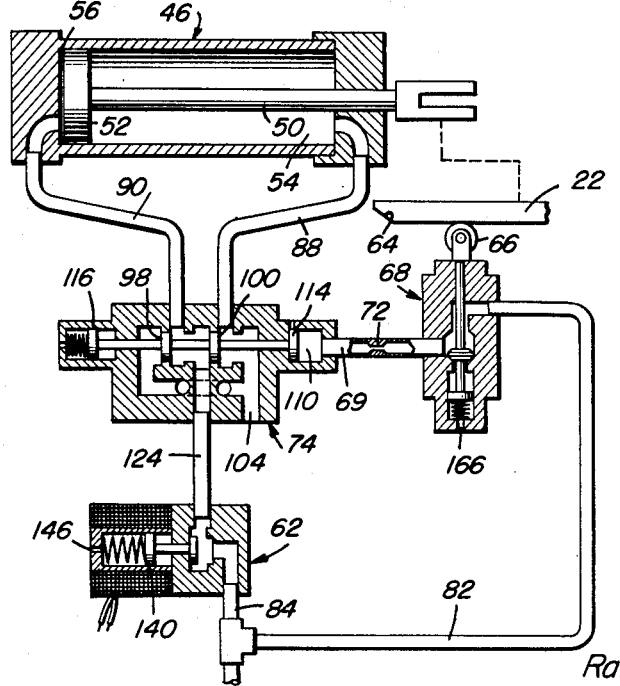

INVENTORS
Ralph Siegel
Eugene A. Annis
BY Walter G. Finch
ATTORNEY

3,181,000
FLUID OPERATED CONTROL SYSTEM
Ralph Siegel, 26 W. Chapman St., Alexandria, Va., and Eugene A. Annis, 225 Stonewall Road, Baltimore, Md.
Filed Sept. 6, 1962, Ser. No. 221,798
9 Claims. (Cl. 307—64)

This application is a continuation-in-part of U.S. application Serial No. 174,500, filed February 20, 1962, now abandoned.

This invention relates generally to transfer systems in power installations, and more particularly it pertains to a fluid pressure operated control for an electrical system in which a primary and secondary source of power will be automatically interchanged.

In hospitals, elevator type buildings, radio and television stations, transportation systems, pumping stations, and other types of similar installations, an unfailing source of electric current generally is required. Although various types of auxiliary systems are presently used and have been previously proposed, switch-over to an auxiliary system during emergency conditions generally requires skilled personnel and often creates considerable confusion before the change is made.

A principal object of this invention is to provide an automatic transfer system using fluid pressure, i.e., pneumatic or hydraulic, to positively control and accomplish the change-over from one source of electrical power to another.

Another object of this present invention is to provide in an automatic current transfer system, a novel mechanical interlock device for positively insuring that only one or the other of a primary and secondary source of power are operatively connected into an electrical system to prevent overloading of the electrical components drawing current.

A further object of this present invention is to provide an automatic transfer system between alternate sources of electrical power in which, after a predetermined interval sufficient to avoid transient voltage dips, a signal will be transmitted to set into operation automatically operating control means for causing a "switch over" between the alternate sources of power.

A still further object of this invention is to provide in an automatic control means automatically set upon switch-over from a first to a second source of power whereby the switch-over may automatically occur from the second source of power to the first source of power.

Another object of this present invention is to provide a control which utilizes a reserve source of stored fluid pressure as the actuating force in the presence of the signal of a current failure or drop in voltage below a predetermined value, in a first power source whereby an immediate switch-over occurs to automatically make a secondary source of power available in the system.

And yet another object of the present invention is to provide a relatively simple, efficient and practical power-source control which can be utilized with dual sources of power for automatically, immediately and imperceptibly changing over from one source of power to another source of power when a signal condition occurs at the control.

Other objects and attendant advantages of the present invention will be readily apparent from the following detailed specification and accompanying drawings, wherein:

FIG. 2 is a diagrammatic view showing a fluid pressure control system, illustrating the relative position of various control component parts when current is provided by a first or normal power source;

FIG. 3 is a view similar to FIG. 2 showing the relative position of the control component parts after normal power fails and a "change over" signal is transmitted to the solenoid control valve;

FIG. 4 is a view similar to FIGS. 2 and 3, illustrating the position of the control component parts after a "change over" has occurred and a secondary or emergency source of power has been made available in a power system;

FIG. 5 is a view similar to FIGS. 2 to 4, illustrating the positions assumed by the control component parts when normal power restoration is detected and the solenoid controlled valve calls for a "change over" to occur from a secondary source of power back to the primary source, i.e., the position shown in FIG. 2;

Although the invention will subsequently be described with respect to dual power sources, it will be readily apparent to those skilled in the art that a plurality of dual power source circuits can be readily controlled by the novel control system of this invention.

Figure 1:
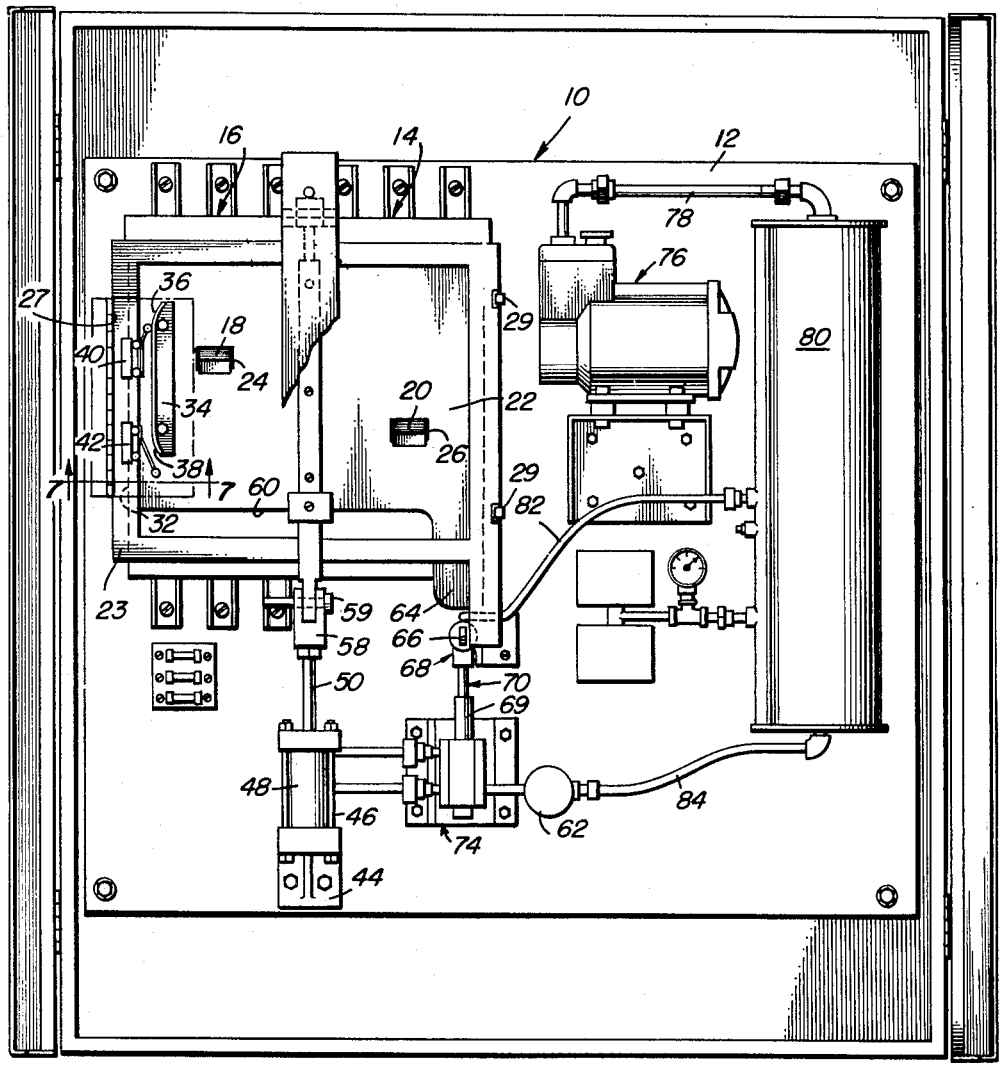
FIG. 1 is a front elevation view of an automatic fluid-operated control assembly incorporating features of this invention.

Referring now to FIG. 1, a control assembly indicated generally by reference numeral 10 is provided which includes a mounting plate or panel 12 upon which are mounted circuit breakers 14 and 16, one being inverted with respect to the other and respectively operatively connected to two sources of power. Operation of the circuit breakers 14 and 16 is controlled by control handles 18 and 20, respectively, projecting laterally from the mounting panel 12.

The circuit breakers 14 and 16 are of any suitable character and thus specific description thereof appears to be unnecessary. Such breakers are commercially available for handling hundreds of amperes of electric current at relatively high voltage as required for the usual applications of this invention.

Overlying the circuit breakers 14 and 16, and suitably insulated therefrom, is a mechanical interlock plate 22 which includes spaced aperture portions 24 and 26 through which the breaker control handles 18 and 20, respectively, project.

Figure 7:
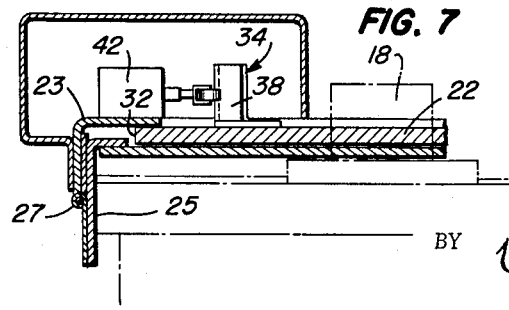
FIG. 7 is a detail sectional view taken along line 7—7 of FIG. 1.

The mechanical interlock plate 22 is mounted reciprocally within a support 23, with the support being swingably secured to enclosure 25 by a hinge 27, and held in a normally closed position by fasteners 29, as indicated best in FIGS. 1 and 7.

In some instances, it is necessary that the single throw switches 14 and 16 be operated manually so as to position both switches to either both "on" or "off." To accomplish this, it is necessary to remove a pin 59, release fasteners 29 and swing the unitary support and plate about hinge 27 to free control handles 18 and 20 for manual operation thereof.

The mechanical interlock plate 22 is reciprocally supported in any suitable manner. Thus, with movement of plate 22, the circuit breakers 14 and 16 are caused to simultaneously and oppositely be thrown in the manner of a double throw switch.

The plate 22 has mounted thereon inwardly of the left edge 32 thereof, vertically elongated abutment element 34 which includes opposed cam ends 36 and 38. Mounted on the hinged support 23, in any suitable manner, is a pair of vertically spaced micro-switches 40 and 42 each of which being operatively connected in a control circuit, to be subsequently discussed in detail with respect to the electrical diagram of FIG. 6.

Mounted on the plate 12 as indicated at 44 is a fluid motor 46 which in the exemplary embodiment will be shown to be pneumatically operated. However, hydraulic operation (not shown) of the fluid motor 46 is believed to be within the scope of the invention. The fluid motor is of the double-acting type as illustrated in the diagrammatic views of FIGS. 2 to 5.

The fluid motor 46 includes a cylinder 48 from which projects a piston rod 50 which is connected to a piston 52 operating within the cylinder 48. The piston 52 defines in the cylinder 48, opposed variable volume chambers 54 and 56 as illustrated in FIGS. 2 to 5.

The piston rod 50 terminates in a bifurcated end portion 58 extending over the lower edge 60 of the interlock plate 22 and secured thereto.

Without describing additional structure it will be noted that the micro-switch 40 is open when the plate 22 is disposed in the upward position shown in FIG. 1 and when the parts are so disposed, the handle 20 controlling circuit breaker 14 will be closed. Movement of the plate 22 downwardly will result in opening of the circuit breaker 14 and closing of the circuit breaker 16 in like manner, and at the same time, the end 38 of the abutment element 34 will engage and open the micro-switch 42 to shut off a control current to a solenoid-operated control valve indicated generally at 62 and mounted on the mounting plate 12 in any suitable manner.

The mechanical-interlock plate 22 is provided with a camming-plate portion 64 which extends beyond edge 60 thereof. Disposed in the path of travel of the camming-plate portion 64 is a roller element 66 which is utilized to control a valve element of a cam-valve indicated generally at 68.

The cam valve 68 is connected through a conduit 69 and nipple 70, which includes an internal, restricted orifice or passage 72, as shown in FIGS. 2 to 5, to a 4-way valve indicated generally at 74, suitably secured on the mounting plate 12.

Figure 6:
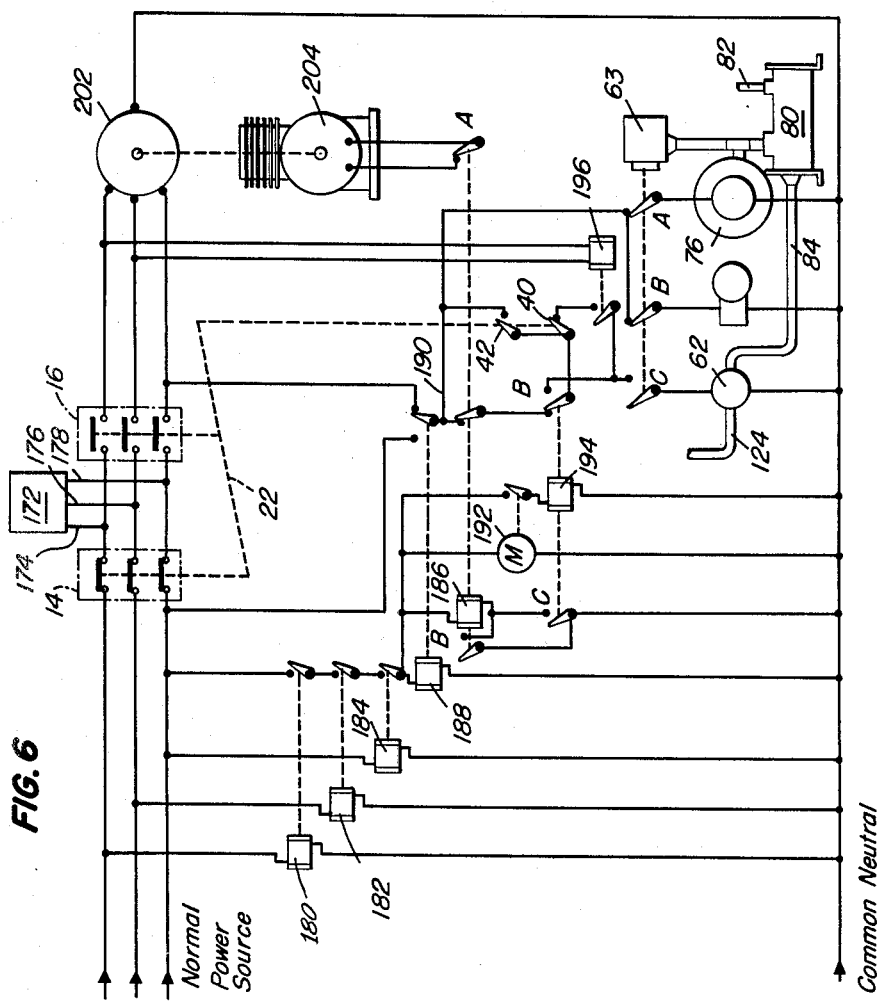
FIG. 6 is a schematic electrical diagram illustrating a typical power installation in which the novel control system of this invention is utilized.

Also mounted on the plate 12, and operatively connected in each of the circuits controlled by circuit breakers 14 and 16, as shown in FIG. 6, is a pump or compressor indicated generally at 76. The compressor 76 is connected through a conduit 78 to a storage tank 80 and after a predetermined pressure build up in the tank, the compressor will automatically cut-out as is conventional.

The tank 80 is connected by branch lines 82 and 84 to the cam valve 68 and 4-way valve 74, respectively.

Referring to FIG. 2, the normal position of the control components 22, 46, 62, 68, and 74 is shown, i.e., the plate 22 will be in the position shown in FIG. 1, solenoid controlled valve 62 will be de-energized due to circuitry subsequently to be described.

The 4-way valve 74 includes a body portion 85 having an internal chamber 86 which communicates through conduits 88 and 90 with internal passages 92 and 94, respectively, of the cylinder 48, which passages, respectively, communicate with the variable volume chambers 54 and 56. The internal chamber 86 of the 4-way valve 74 has extending axially therethrough, a slide-valve rod 96 having spaced, annular valving elements 98 and 100 mounted on intermediate portions thereof. The opposite ends of the chamber 86 communicate to the atmosphere by means of communicating exhaust passages 102 and 104.

Extending about intermediate, inner peripheral portions of the chamber 86 are spaced pairs of annular, valving-lands 106, 106′ and 108 and 108′. The body portion 85 includes at opposite ends thereof control chamber portions 110 and 112 in which the rod 96 terminates.

The rod 96 has fixed on the end thereof in chamber 110 a piston element 114 which is subject to pressure from the metering orifice 72. The other end of the rod 96 in chamber 112 has fixed thereto an abutment 116 engaged by a compression spring 118. The chamber 112 includes a bleed orifice 120 to prevent the accumulation of pressure therein and to permit movement of the rod 96, valves 98, 100 and the piston 114, toward the left in the presence of pressure on piston 114. It will be noted that spring 118 normally biases the valve rod and valve to the position shown in FIG. 2, and piston 52 will be at the extreme right as shown.

The valve body 85 includes an intermediate passage 122 communicating between lands 106′ and 108′ between valve elements 98 and 100. The passage 122 communicates with the solenoid controlled valve 62 by means of a conduit 124.

The solenoid controlled valve 62 comprises a body 126 which includes an internal chamber 128 having a lateral valve seat 130 at the terminal end of an internal passage 132 which communicates with the inlet pressure line 84 which, in turn, communicates with the storage tank 80.

The body 126 includes field coil windings 134 forming a field for controlling reciprocation of an armature or magnetically controlled valve element including an axially disposed rod 136 having at one end a valve portion 138 in the chamber 128 engageable on the valve seat 130.

The rod 136 includes at the other end an abutment element 140 engaged by a compression spring 142 which is disposed in a chamber 144 surrounded by the field coil windings 134. The chamber 144 includes an axial relief orifice 146 to relieve internal pressure therein.

The cam valve 68 includes a body 148 having an axial chamber 150 including a valve seal 152 at one end thereof. The chamber 150 communicates with an internal passage 154 thereabove. The passage 154 communicates with a branch passage connected to line 82 from the storage tank 80.

Extending through the passages 150, 154 there is provided a valve rod 156 which projects out of the upper end of the body 148 and upon which roller element 66 is mounted. The rod 156 has secured on an intermediate portion thereof a valve element 158. This valve element 158 is normally engaged on valve seat 152 due to biasing pressure of a spring 160 engaging an abutment element 162 on the lower end of rod 156 which is disposed in an internal chamber 164 of the body 148. The chamber 164 is vented to the atmosphere by orifice 166.

Referring now to the typical electrical schematic diagram shown in FIG. 6, a load 172, such as a radio station, for example, to which power must not fail is depicted connected by conductors 174, 176, 178 to the common wiring between the output terminals of the two circuit breakers 14 and 16.

A normal power source, such as public service is represented by the conductors entering the diagram from the left and connecting to the input terminals of circuit breaker 14. An emergency source of power, which may be an alternator 202 powered by a gas engine 204, is shown connected to the input terminals of the circuit breaker 16.

During normal operation voltage, sensitive relays 180, 182, 184 connected to the normal power source will be energized and their associated contacts shown will be closed. The circuit breaker 14 is closed, thus providing normal power to the load 172. Since plate 22 mechanically links circuit breaker 14 to circuit breaker 16, the latter, of course, is open. Plate 22 has also closed micro-switch 42 and opened micro-switch 40, as previously related.

A control relay 188 is energized through the contacts of relays 180, 182, 184 and its contact shifted to provide power from the normal source to a control power bus 190.

A timer 192, adjustable from three (3) to thirty (30) minutes and preferably set for fifteen (15) minutes, is assumed timed out and energizes an auxiliary relay 194. With relay 194 closed, a time delay relay 186 having five (5) minute pickup and two (2) second drop out is assumed timed out and closed.

The compressor 76 has brought pressure up in the storage tank 80 and pressure switch 63 holds open its contacts A and B with contact C closed. The generator engine 204 is shut down since contact A of relay 186 is open.

As shown in FIG. 2, the piston rod 52 of the fluid motor 46 is in the extended condition with plate 22. Both valves 62 and 68 are closed.

During an emergency operation, power failure causes one or more of the voltage sensitive relays 180, 182, 184 to de-energize and open. The control relay 188 drops out to transfer the control power bus 190 to the emergency source. The timer 192 and its auxiliary relay 194 drop out.

After a time delay (assuming that the trouble is not merely a transient), time delay relay 186 drops out to close its contact A to start the gas engine 204. Relay 186 is locked out from reclosing by its own open contact B.

When a frequency-voltage sensitive relay 196 senses the proper frequency and the voltage from the emergency source or alternator 202, the solenoid control valve 62 is energized through closed contacts indicated by reference numerals 196, 42, 194 and 186 in series to control the power bus 190.

With energization of the solenoid controlled valve 62 as shown in FIG. 3, compressed fluid from storage tank 76 is conveyed by branch line 84 to conduit 124 to the four way valve 74. Thence, it enters the fluid motor 46 through the conduit 88. Piston 52 then shifts to retract piston rod 50, as best shown in FIG. 4.

This causes the pneumatic shifting of the interlock plate 22 and the opening of the circuit breaker 14 and closing of the circuit breaker 16. The load 172 is now connected to the emergency source or alternator 202.

The microswitch 42 now opens to de-energize and close the solenoid valve 62 and the microswitch 40 closes to set up a return-to-normal circuit.

With further reference to FIG. 4, the camming plate portion 64 of plate 22 engages roller 66 to open valve 68, thus allowing a retarded flow of fluid through the metering orifice 72 from the supply line 82 to act on piston element 114 in the four way valve 74. This causes the spool or valving elements 98 and 100 to shift, venting the fluid motor 46 to atmosphere through the conduit 88 and communicating conduit 90 to conduit 124, leading to the now closed and de-energized solenoid controlled valve 62 ready for a return-to-normal operation.

The return-to-normal operation will now be explained. With restoration of power on the normal power source, all the voltage sensitive relays 180, 182, 184 pick up. The control relay 188 picks up to transfer control power bus 190 to the normal source.

The timer 192 starts a timing cycle of fifteen (15) minutes to assure that the restoration of power is not temporary. After timer 192 times out, the auxiliary relay 194 picks up the closing contact B of the relay 194 and circuit through closed microswitch 42 causes the solenoid valve 62 to energize and open.

Fluid under pressure flows in the direction of the arrows of FIG. 5 through the conduit 124, four way valve 74, conduit 90, and moves against the piston 52 in the fluid motor 46.

Piston 52 through the piston rod 50 shifts interlock plate 22 occurs this time in a reverse direction (to the right in FIG. 5) opening circuit breaker 16 and closing circuit breaker 14 and transferring the load 172 to the normal power source. The opening of microswitch 40 de-energizes the solenoid valve 62.

Meanwhile, the contact C of the relay 194 has started the time delay relay 186. When the latter has timed out, it locks itself in through its contact B and opens the contact A to shut down the gas engine 204. The microswitch 42 is now in closed position, resetting the circuit in readiness for re-transfer to emergency operation.

Camming plate portion 64 of the plate 22 releases valve 68, which moves in a position to shut off the fluid pressure in condition 69 from the branch line 82. It also bleeds the control chamber 110 of four way valve 74 through the orifice 72 to atmosphere through vent orifice 166. The spool or valving elements 98 and 100 of the four way valve shift to the right under the urging of spring 118.

This action vents the conduit 90 of the fluid motor to atmosphere and connects the conduit 88 to the conduit 124 of the now-closed solenoid valve 62, ready for another cycle of operation.

In the light of the above teachings other arrangements in addition to the preferred example described will now occur to those skilled in the art. For example, instead of a four way valve for controlling the fluid motor, a pair of three way normally closed solenoid valves can be used to feed respectively the extend and retract conduits. To "dump" the exhaust air directly to atmosphere, each conduit is provided with a quick exhaust valve.

The principle of the interlock plate can be applied to control one or a large plurality of circuit breakers, all closing or all opening or a combination of both with the stroking of the fluid motor.

Obviously many modifications and variations of the present invention are possible in light of the above teachings. It is, therefore, to be understood that within the scope of the appended claims the invention may be practiced otherwise than as specifically described.

What is claimed is:

1. An electrical changeover system for making available two independent electrical power sources to a load, comprising, double-throw switch means for transferring a load from one of said electrical power sources to the other of said electrical power sources, independent stored energy means for shifting said double-throw switch means to transfer said load from said one of said electrical power sources to the other of said electrical power sources, means coupled to and responsive to the failure of said one of said electrical power sources, means coupled between said responsive means and said stored energy shifting means for controlling said double-throw switch means for automatically transferring said load to the other of said electrical power sources upon failure of said one electrical power source as indicated by said responsive means, and interlock means coupled between said double-throw switch means and said control means for sensing the position of said double-throw switch means with the cycle of operation of said changeover system.

2. An electrical changeover system as recited in claim 1, and additionally means for restoring said double-throw switch means back to said one electrical power source on restoration of electrical power in said one electrical power source.

3. An electrical changeover system as recited in claim 2, and additionally means for assuring said restoration of the electrical power in said one electrical power source is greater than a predetermined time.

4. An electrical changeover system as recited in claim 1, wherein said stored energy shifting means for operating said double-throw switch means is hydraulical.

5. An electrical changeover system for making available alternately a normally active electrical power source and a normally inactive electrical power source to a load, comprising, double-throw switch means for transferring a load from a first normally active electrical power source to a second normally inactive electrical power source, independent stored energy means for shifting said double-throw switch means to transfer said load from said normally active electrical power source to said normally inactive electrical power source upon failure of said normally active electrical power source, means coupled to and responsive to the failure of said normally active electrical power source, control means coupled between said responsive means and said stored energy shifting means for controlling said double-throw switch means for automatically transferring said load to said normally inactive electrical power source upon failure of said normally active electrical power source as indicated by said responsive means, means including a start-up device coupled between said control means and said normally inactive electrical power source for activating said normally inactive electrical power source upon indication by said responsive means of failure of said normally active electrical power source, means for restoring said double-throw switch means back to said normally active electrical power source on restoration of electrical power in said normally active electrical power source and for inactivating said normally inactive electrical power source, and interlock means coupled between said double-throw switch means and said control means for sensing the position of said double-throw switch means and interlocking said double-throw switch means with the cycle of operation of said changeover system.

6. A changeover system as recited in claim 5, and additionally means for assuring said restoration of said electrical power in said normally active electrical power source is greater than a predetermined time.

7. An electrical changeover system for making available alternately a normally active electrical power source and a normally inactive electrical power source to a load, comprising, double-throw switch means for transferring a load from a first normally active electrical power source to a second normally inactive electrical power source, independent stored energy means coupled between said normally active electrical power source and said double-throw switch means for shifting said double-throw switch means to transfer said load from said normally active electrical power source to said normally inactive electrical power source upon deenergization of said normally active electrical power source, means including a start-up device coupled to said shifting means for activating said normally inactive electrical power source upon an indication that said normally active electrical power source has become deenergized, and interlock means coupled between said double-throw switch means and said independent stored energy means for sensing the position of said doublet-throw switch means and interlocking said double-throw switch means with the cycle of operation of said changeover system.

8. An electrical changeover system as defined in claim 7, and additionally means for assuring restoration of said electrical power in said normally active electrical power source is greater than a predetermined time.

9. An electrical changeover system as recited in claim 7, wherein said stored energy shifting means for operating said double-throw switch means is hydraulic.

References Cited by the Examiner
UNITED STATES PATENTS

| | | | |
|---|---|---|---|
| 2,590,611 | 3/52 | Gunter | 307—64 |
| 2,783,393 | 2/57 | Lindahl et al. | 307—64 |
| 2,861,198 | 11/58 | Soos | 307—64 |
| 3,014,136 | 12/61 | Leimkuhler | 307—64 |